(12) United States Patent  
Grbic

(10) Patent No.: US 7,984,697 B2  
(45) Date of Patent: Jul. 26, 2011

(54) PET LEG RESTRAINING DEVICE DURING BATHING, GROOMING, NAIL CLIPPING, AND EXAMS

(75) Inventor: Nikolina Grbic, Stone Mountain, GA (US)

(73) Assignee: Nikolina Grbic, Ormond Beach, FL (US)

( * ) Notice: Subject to any disclaimer, the term of this patent is extended or adjusted under 35 U.S.C. 154(b) by 0 days.

(21) Appl. No.: 12/195,290

(22) Filed: Aug. 20, 2008

(65) Prior Publication Data

US 2009/0071416 A1 Mar. 19, 2009

Related U.S. Application Data

(60) Provisional application No. 60/972,620, filed on Sep. 14, 2007.

(51) Int. Cl.  
*A01K 3/00* (2006.01)

(52) U.S. Cl. .................. 119/769; 248/205.8; 119/756

(58) Field of Classification Search .......... 119/755, 119/756, 856, 816, 819, 769, 796–797, 814, 119/863, 865; 248/683, 537, 205.5, 205.8, 248/206.2, 206.4, 309.3; 54/64; 224/148, 224/559; 294/64.1

See application file for complete search history.

(56) References Cited

U.S. PATENT DOCUMENTS

| | | | | |
|---|---|---|---|---|
| 144,198 A * | 11/1873 | Ford | ...... | 119/771 |
| 566,816 A * | 9/1896 | Taylor et al. | ...... | 248/205.5 |
| 2,302,300 A * | 11/1942 | Davies | ...... | 224/559 |
| 2,420,811 A * | 5/1947 | Brewster et al. | ...... | 294/64.1 |
| 4,261,296 A * | 4/1981 | Rosenberg | ...... | 119/756 |
| 4,693,212 A * | 9/1987 | Black | ...... | 119/755 |
| 4,736,945 A * | 4/1988 | Vinciguerra | ...... | 482/82 |
| D337,395 S * | 7/1993 | Erlinger et al. | ...... | D30/153 |
| 5,373,814 A * | 12/1994 | Seymour | ...... | 119/795 |
| 5,481,764 A * | 1/1996 | Nelson | ...... | 4/559 |
| 5,806,816 A * | 9/1998 | Hull et al. | ...... | 248/205.6 |
| 5,829,392 A * | 11/1998 | Coleman | ...... | 119/795 |
| 5,915,336 A * | 6/1999 | Watson | ...... | 119/797 |
| 6,382,137 B1 * | 5/2002 | Derrieu et al. | ...... | 119/654 |
| 6,406,407 B1 * | 6/2002 | Wiedmann et al. | ...... | 482/82 |
| 7,066,434 B2 * | 6/2006 | Kwok | ...... | 248/205.8 |

\* cited by examiner

*Primary Examiner* — Rob Swiatek  
*Assistant Examiner* — Ebony Evans  
(74) *Attorney, Agent, or Firm* — 24hrpatent.com

(57) ABSTRACT

A versatile and mobile pet leg restraining device used to secure dogs in a stationary position while performing bathing, grooming, nail clipping, and veterinarian exam operations. The pet leg restraining device attaches to most grooming tables, tubs and sinks and consists of suction cups, suction cup attachment hooks, adjustable straps and hook and loop or Velcro attachments. The pet leg restraining device is designed to secure the animal in a variety of positions by its legs to impair movement in a safe and comfortable manner.

1 Claim, 3 Drawing Sheets

PET LEG RESTRAINING DEVICE DURING BATHING, GROOMING, NAIL CLIPPING, AND EXAMS

PREVIOUS FILING

This application emanates from a previous filing; application No. 60/972,620 filed Sep. 14, 2007.

FIELD OF THE INVENTION

The present invention relates generally to pet accessories and, more particularly, to a restraint for use while grooming dogs that is portable and versatile in design, maintaining the animal in a fixed position during grooming operations.

With the growing number of households owning pets, it is becoming increasingly popular to send one's dog to a pet grooming service in order to have its hair cut, shampooed and styled, nails trimmed, etc. These pet grooming establishments are staffed by professional personnel that utilize specialized equipment to carry out the many different procedures involved. Among the special equipment used, various anchoring devices, such as straps, support frames and collars, are used to secure the animal to the tables and platforms upon which the procedures are carried out, thereby, limiting their movement. These restraining mechanisms are necessary for the safety of both the dog and the grooming personnel, preventing injury from the sharp devices sometimes used in hair cutting and nail trimming. Furthermore, the immobility of the dog is essential in providing a uniform, quality haircut. The device must be capable of immobilizing the dog's head, chest, and haunch areas separately and permit access to the animal's entire body so that it can be groomed properly.

In the ancillary art, several devices have been developed that somewhat immobilize the dog during grooming and veterinary procedures. U.S. Pat. No. 4,041,905, issued in the name of Prager et al., U.S. Pat. No. 4,186,690, issued in the name of Seiler, U.S. Pat. No. 5,178,098, issued in the name of Samberg, and U.S. Pat. No. 5,279,257, issued in the name of Tremby, disclose dog grooming restraining devices wherein the animal is restrained to the work surface by a flexible neck collar secured to a rigid grooming table member. The devices are adjustable so as to accept animals of varying size and height. These devices are somewhat effective in immobilizing the animal's head and neck; however they do permit some movement due to the non-rigid characteristics of the strap itself. Furthermore, they are somewhat effective in immobilizing the animal's mid-section; however it does not permit versatile use on all solid surfaces and requires unreasonable mounting hardware.

U.S. Pat. No. 5,960,746, issued in the name of Salt, discloses a rigid animal restraining device wherein a rigid support frame is attached to the grooming table. The dog is restrained by a strap, hanging from the frame above the animal that is secured around the dog's abdomen. The strap is adjustable in length so as to accommodate animals of varying size and height. This device is somewhat effective in immobilizing the animal's mid-section; however it does not permit versatile use on all solid surfaces and requires unreasonable mounting hardware.

U.S. Pat. No. 5,243,931, issued in the name of McDonough, discloses an animal restraining device wherein the dog is restrained by a pair of straps secured to the surface beneath the animal. The straps secure the animal around the abdomen and around its chest. The straps are adjustable in length so as to accommodate animals of varying size and height. This device is somewhat effective in immobilizing the animal's mid-section; however it does not permit versatile use on all solid surfaces and requires unreasonable mounting hardware.

U.S. Pat. No. 3,580,222, issued in the name of Dunn, discloses an animal restraining device wherein a rigid support frame is attached to the ceiling directly above the grooming table. Suspended from the frame are three straps that are used to restrict the movement of the animal. The straps can be used in a variety of configurations, attaching to the dog's neck, legs, haunch and chest. The straps are adjustable in length so as to accommodate animals of varying size and height. This device is somewhat effective in immobilizing the animal; however it does permit some movement due to the non-rigid characteristics of the straps themselves and, depending upon the configuration, may permit totally unrestricted movement in one or more areas.

U.S. Pat. No. 3,092,079, issued in the name of Strebel et al., discloses an animal restraining device wherein a rigid support frame is attached to the grooming table. The frame includes an elongated U-shaped support mounted to an adjustable height pole into which the dog's mid-section is placed and strapped. This device appears to be effective in immobilizing the animal's mid-section, however it does permit significantly unrestricted movement of the head, front and rear portion of the animal. This device is somewhat effective in immobilizing the animal's mid-section; however it does not permit versatile use on all solid surfaces and requires unreasonable mounting hardware.

U.S. Pat. No. 3,120,836, issued in the name of Brauning, discloses an animal restraining device wherein a rigid support frame is attached to the grooming table. The frame includes an elongated U-shaped support mounted to an adjustable height pole into which the dog's mid-section is placed and strapped. Also, a separate, adjustable frame supports a collar for securing the animal's neck. This device appears to be effective in immobilizing the animal's mid-section and substantially immobilizing its head and neck, however it does permit significantly unrestricted movement of the front and the rear portion of the animal. This device is somewhat effective in immobilizing the animal's mid-section; however it does not permit versatile use on all solid surfaces and requires unreasonable mounting hardware.

U.S. Pat. No. 3,250,252, issued in the name of Leopold, discloses a veterinary animal restraining device wherein a rigid support frame is attached to the grooming table. The frame includes three elongated U-shaped supports mounted to adjustable height poles, each of which extends vertically from a frame that attaches to the surface of a table. The dog's head, chest and haunch each fit into one of the U-shaped supports and are secured therein via a strapping mechanism. This device appears to be effective in immobilizing the dog's body, however it does not allow for selective immobilization of the animal. This device is somewhat effective in immobilizing the animal's mid-section; however it does not permit versatile use on all solid surfaces and requires unreasonable mounting hardware.

U.S. Pat. No. 2,804,845, issued in the name of Plumley et al., discloses a veterinary animal restraining device wherein a rigid support frame is attached to the grooming table. The frame includes two U-shaped supports and a muzzle mounted to adjustable height poles that extend from a frame that attaches to the surface of a table. The dog's snout fits into the muzzle and the neck and haunch each fit into one of the U-shaped supports and are secured therein via a strapping mechanism. This device is somewhat effective in immobilizing the animal's mid-section; however it does not permit versatile use on all solid surfaces and requires unreasonable mounting hardware. Furthermore, the U-shaped supports and the surface-mounted frame can prohibit grooming procedures in a substantially large portion of the animal's frontal midsection and chest area.

SUMMARY OF THE INVENTION

Briefly described according to a preferred embodiment, the present invention consists of suction cups that attaches to any smooth or shiny surface with adjustable straps and Velcro attaching to each of the suction cups for animal stability. This device will eliminate the possibility of pet strangling due to falling off the grooming table because the pet is restrained directly to the surface by all of its legs in a safe and comfortable way.

In summary, the device is for restraining a pet using a suction cup, hook, strap, and Velcro to wrap around the legs. The suction cup has a hook where a strap is attached to Velcro. The suction cup sticks to a smooth or glossy surface such as a bath tub and counter top. The Velcro attaches to the pet's legs. One suction cup and one Velcro strap per leg. This device eliminates the possibility of pet strangling due to falling off the grooming table.

It is a device for restraining the movement of a pet's legs when bathing, grooming, nail clipping or during medical exams. This device can be used by any dog owner, veterinarians, groomers, kennels or breeders. The device consists of a suction cup with a hook for a strap and Velcro that attaches to the leg. Four of these devices are needed to restrain all legs. First, the Velcro is wrapped around all legs (1 Velcro per leg). Then, the pet is placed in a safe and comfortable position on a smooth or glossy surface, and the suction cups are pressed down for full restraint.

DESCRIPTION OF THE PREFERRED EMBODIMENT

Figure 1:
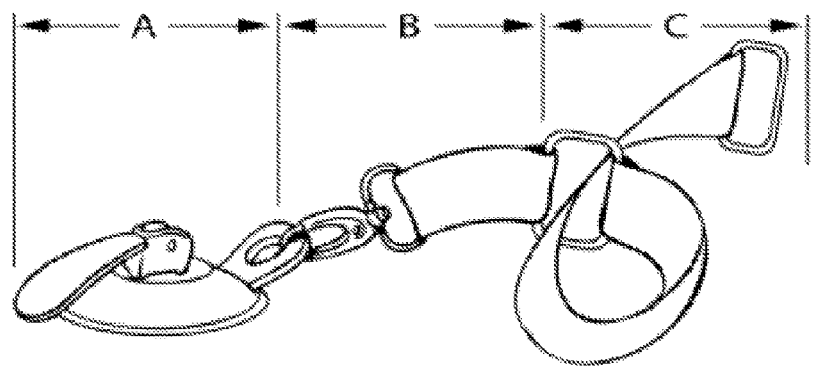
FIG. 1 Perspective frontal view of the device
FIG. 2 Side view of the device
FIG. 3 Perspective side view of the device thereof
FIG. 4 Top view of the device
FIG. 5 Front perspective view of the device while in use
FIG. 6 Close up perspective of the device in use
Figure 2:
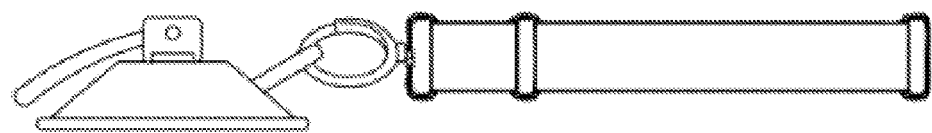

FIG. 1 shows the full PetStay set. It has two Velcro straps (B and C). The short Velcro strap (B) works as a link between the suction cup (A), and the long Velcro strap (C) on the dog's leg.

The long Velcro strap can be adjusted and locked onto the dog's legs. The short Velcro strap will give the leg a little bit of room to move, so the dog feels comfortable. In other patent designs, people usually use a long rope that tightens around the dog's neck or body, and the other side of the rope connects to a suction cup. These kinds of designs can restrain the dogs in one location, but cannot lock them in one position. In addition, restraining a dog by the neck can lead to possible injury or death if left unattended and the dog attempts to jump off the table. The dogs still have plenty of room to move around, which can make the grooming very difficult.

Figure 3:
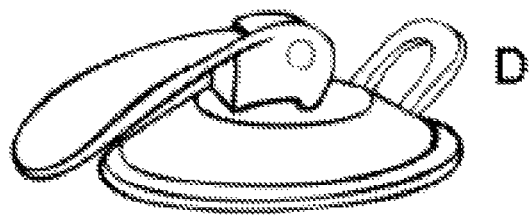
Figure 4:
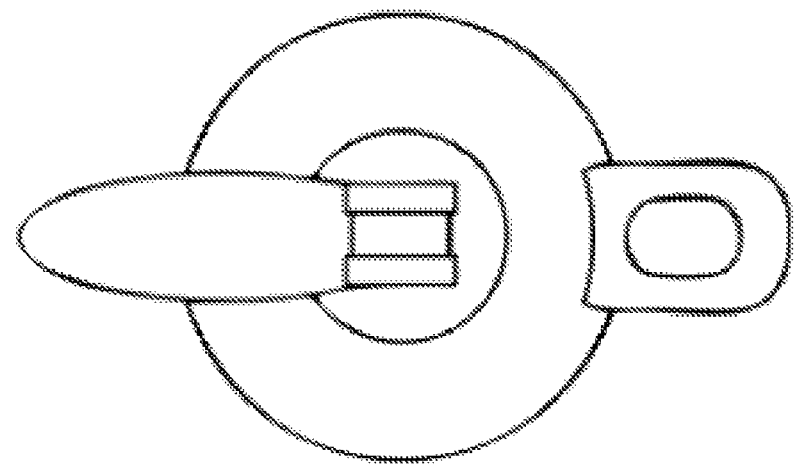

FIG. 3 shows the uniquely designed suction cup. The handle on the top: move it left (down position) and it will lock the suction cup, while move it right and it will release (up position). The plastic ring (D) is part of the suction cup cover. It distributes the pulling force from the Velcro straps evenly on the suction cup. This kind of design makes the suction strong and stable.

Figure 5:
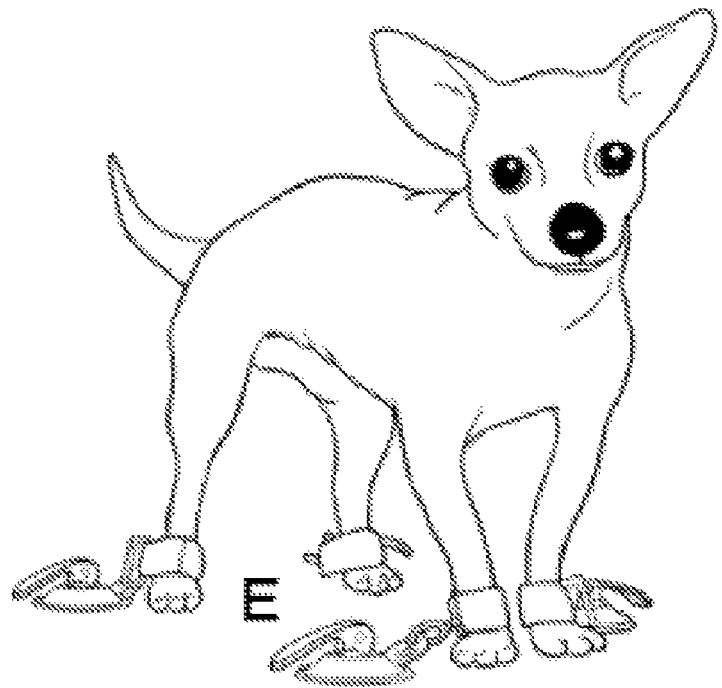

FIG. 5 shows the full view of a dog with PetStay set. Four suction cups (E) will make a dog stay in any kind of position by restraining all 4 legs. The dog cannot walk or jump with the PetStay attached to its legs, but the legs still have a little bit of room for the dog to adjust in a comfortable position. Other designs usually have only one suction cup to restrain full body while the dog's legs are free, so they can still jump or move around.

Figure 6:
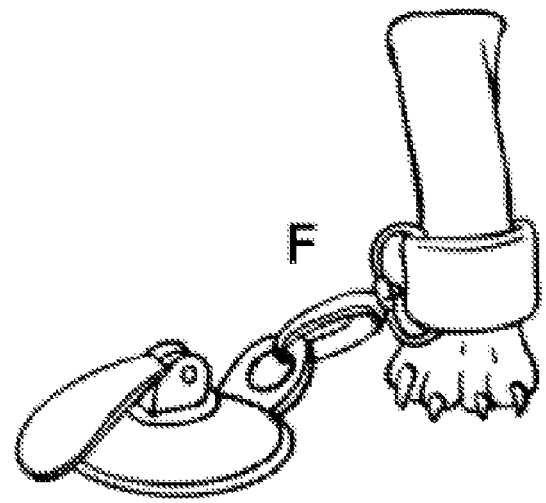

FIG. 6 shows a detailed view of PetStay on a dog's leg. The Velcro strap (F) wraps just above the dog's paw and holds the leg into place. Based on testing, at first, the dog usually tries to walk away or move; after they realize that PetStay won't let them go, they will calm down and stay in the same location and in the same position.

What is claimed is:

1. A pet leg restraining device comprising:
   a mounting device comprising a suction cup with a locking means at the apex of the suction cup and a first ring on the suction cup, offset from said locking means and spaced inwardly from the outer edge of the suction cup and designed to receive a swivel snaphook;
   a first connecting strap comprising a strip of flexible material with proximal and distal ends, the proximal end having a swivel snaphook to connect to the first ring on the suction cup and the distal end having a securing means for securing the first connecting strap to a second ring; and
   a second connecting strap comprising a strip of flexible material with proximal and distal ends, the proximal end having an attaching means to connect to the second ring and the second connecting strap further having a securing means that is adjustable to restrain a pet leg.

* * * * *